(12) United States Patent
Stimek et al.

(10) Patent No.: US 11,223,226 B2
(45) Date of Patent: Jan. 11, 2022

(54) COVERT SMART SOLAR POWER SYSTEM AND METHOD OF USE

(71) Applicant: WilliamsRDM, Inc., Fort Worth, TX (US)

(72) Inventors: Christopher M. Stimek, Fort Worth, TX (US); Eduardo M. Hinojosa, Fort Worth, TX (US); Donald W. Murray, Santo, TX (US)

(73) Assignee: WilliamsRDM, Inc., Fort Worth, TX (US)

(*) Notice: Subject to any disclaimer, the term of this patent is extended or adjusted under 35 U.S.C. 154(b) by 0 days.

(21) Appl. No.: 17/031,648

(22) Filed: Sep. 24, 2020

(65) Prior Publication Data

US 2021/0099008 A1 Apr. 1, 2021

Related U.S. Application Data

(60) Provisional application No. 62/906,681, filed on Sep. 26, 2019.

(51) Int. Cl.
| | | |
|---|---|---|
| *H02J 7/35* | (2006.01) | |
| *H02S 40/38* | (2014.01) | |
| *H04N 7/18* | (2006.01) | |
| *H02S 40/36* | (2014.01) | |
| *H02J 7/00* | (2006.01) | |

(52) U.S. Cl.
CPC .............. *H02J 7/35* (2013.01); *H02J 7/0068* (2013.01); *H02S 40/36* (2014.12); *H02S 40/38* (2014.12); *H04N 7/18* (2013.01); *H02J 2300/22* (2020.01)

(58) Field of Classification Search
CPC .............. G06Q 10/08; G06Q 10/0833; G06Q 10/0832; H02K 35/02; H02K 7/92; H02K 7/075; H02K 11/00; H02K 11/20; H02K 11/30; H02S 10/00; H02S 10/10; H02S 10/20; H01L 35/32; B60L 8/00; B60L 8/003; F04D 13/06
USPC .. 307/19, 21, 66, 64, 80, 82, 87, 83–85, 43; 417/411, 423.14
See application file for complete search history.

(56) References Cited

U.S. PATENT DOCUMENTS

| | | | | |
|---|---|---|---|---|
| 5,813,749 | A * | 9/1998 | Sheldon | A47G 29/1209 362/155 |
| 6,096,969 | A * | 8/2000 | Fujita | H02S 30/20 136/259 |
| 9,494,297 | B1 * | 11/2016 | Nagengast | F21V 13/04 |
| 2003/0090896 | A1 * | 5/2003 | Sooferian | F21S 8/022 362/183 |
| 2012/0020060 | A1 * | 1/2012 | Myer | F21S 8/085 362/183 |
| 2013/0294952 | A1 * | 11/2013 | Caprathe | F04D 25/084 417/411 |

(Continued)

*Primary Examiner* — Rexford N Barnie
*Assistant Examiner* — Terrence R Willoughby
(74) *Attorney, Agent, or Firm* — Foley & Lardner LLP (57) ABSTRACT

A covert smart solar power system for use with a covert data collection device, the covert smart solar power system having a power storage device, a power source coupled to the power storage device, and a power transmission interface configured to couple the covert data collection device to at least one of the power storage device and the power source. The power source includes a natural object enclosure, a power generation apparatus embedded in the natural object enclosure, and a failure mitigation aspect coupled to the power generation apparatus.

20 Claims, 7 Drawing Sheets

(56) References Cited

U.S. PATENT DOCUMENTS

| | | | |
|---|---|---|---|
| 2014/0070708 A1* | 3/2014 | Zhu | F21S 9/035 |
| | | | 315/152 |
| 2014/0168430 A1* | 6/2014 | Unger | H04N 7/183 |
| | | | 348/143 |
| 2017/0141718 A1* | 5/2017 | Anderson | H02S 40/34 |
| 2019/0087775 A1* | 3/2019 | Buehre | G06Q 10/0833 |
| 2020/0007018 A1* | 1/2020 | Dakhil | B60L 8/003 |
| 2020/0395886 A1* | 12/2020 | Cramer | H02S 40/22 |

\* cited by examiner

COVERT SMART SOLAR POWER SYSTEM AND METHOD OF USE

CROSS-REFERENCE TO RELATED APPLICATIONS

This application claims the benefit of and priority to U.S. Prov. Pat. App. No. 62/906,681, filed on Sep. 26, 2019, and entitled "Covert Smart Solar Power System," the disclosure of which is hereby incorporated by reference in its entirety.

TECHNICAL FIELD

This disclosure relates to solar panel systems, and in particular, to covert solar powered devices.

BACKGROUND

Solar panels are typically used to power remotely deployed sensor and camera systems to reduce or eliminate the need to change batteries. In many surveillance applications, it is necessary to camouflage and conceal the equipment to avoid detection. If the equipment is detected it could be vandalized, stolen or the area may be avoided all together. Certain aspects of these systems, such as cameras and battery packs, may be easily camouflaged, however solar panels need to be located in a sunny area to recharge the batteries. Solar panels are highly reflective and identifiably different from the surrounding environment, and thus are easily detectable.

SUMMARY

This disclosure describes methods and systems for a covert smart solar power system.

According to a first embodiment, a covert smart solar power system is provided for use with a covert data collection device. The covert smart solar power system includes a power storage device, a power source coupled to the power storage device, and a power transmission interface configured to couple the covert data collection device to at least one of the power storage device and the power source. The power source includes a natural object enclosure, a power generation apparatus embedded in the natural object enclosure, and a failure mitigation aspect coupled to the power generation apparatus According to a second embodiment, a covert power source coupled to a covert data collection device includes a natural object enclosure, a power generation apparatus embedded in the natural object enclosure, and a failure mitigation aspect coupled to the power generation apparatus.

According to a third embodiment, a method of manufacturing a covert power source includes forming from a mold of a natural object enclosure having a light transmissive portion and a base portion. The mold is shaped as a natural object. The method further includes pouring a first potting compound into the mold to create the light transmissive portion, embedding a power generation apparatus into the light transmissive portion, and curing the first potting compound. The method further includes pouring a second potting compound into the mold to create the base portion, embedding a secondary covert smart solar power system component into the base portion, curing the second potting compound, and removing the covert power source from the mold.

BRIEF DESCRIPTION OF THE DRAWINGS

The disclosure will become more fully understood from the following detailed description, taken in conjunction with the accompanying figures, wherein like reference numerals refer to like elements, in which:

FIGS. 5-6B are illustrations of a natural object enclosure of the covert smart solar power system, according to an exemplary embodiment.

DETAILED DESCRIPTION

This disclosure presents an apparatus and method for an improved covert smart solar power system that overcomes many challenges and limitations of prior efforts to attach solar panels to cameras. In prior endeavors, solar panels have been connected to a battery or to a game camera that does not support recharging. The camera will run on the solar panel during the day and the battery at night. However, such systems are prone to damage and reduced useful life, as the battery is susceptible to overcharging by the solar panel. Moreover, prior efforts to provide a solar panel exhibit concealability challenges. Typical solar panels are angular and reflective with planar surfaces that are out of place in natural environments. Additionally, the need of solar panels to be exposed to light in order to properly operate hinders prior efforts to conceal the angular, reflective, or planar aspects of solar panels. Thus there is a need for a covert smart solar power system and a corresponding method of use.

The covert smart solar power system disclosed includes one or more solar panel disposed inside a simulated natural object (a "natural object enclosure"). The solar panel may be potted inside a natural object enclosure. The solar panel may be placed inside a natural object enclosure having a closable lid. In some instances, the solar panel is potted inside of a clear urethane material which is molded to look like a natural object (e.g., a rocks, a tree log, etc.) (e.g., a natural object enclosure). In various embodiments, the natural object enclosure resembles objects that might not be natural or earth-derived in origin, but which might be expected to appear in an environment. Thus, as used herein "natural object enclosure" refers to the characteristic of the enclosure being expected to appear in an environment (e.g., naturally present, naturally occurring, naturally expected) and not exclusively to earth-derived objects. For instance, a natural object enclosure may be an enclosure that resembles a human-developed object, or an artificial structure which is commonly found in an environment or which is not out of place in the environment. For example, the natural object enclosure may resemble objects commonly found in a desired environment such as tires, fence posts, pavers, phone service boxes, home décor items, garbage bins, and the like. To help the natural object enclosure blend in to natural environments, a coat of specially formulated paint to color the mold may be used to better blend with the surroundings. Thus, from the outside in the sun, the natural object enclosure having a solar panel looks opaque but still allows sufficient light through for the solar panels to charge a battery.

Further enhancing the reliability and concealability of the covert smart solar power system, wires leaving the natural object enclosure may be armored for rodent resistance and/or buried or otherwise concealed. The system and methods provided also overcome challenges related to potential overcharging of the battery and damage to the battery or reduction of its useful life. For instance, the system may include an integrated Maximum Power Point Tracking (MPPT) and battery charging integrated circuit (IC). The circuit is operable to allow the covert smart solar power system including a solar panel inside a natural object enclosure to extract as much energy from the solar illumination under changing lighting conditions, as well as to ensure the batteries are charged properly. The natural object enclosure having an enclosed solar panel may further be connected to COTS battery boxes for remote game cameras, for instance, to charge batteries and extend deployment time. Further, where the solar panel connects directly to a camera and does not have a battery box, batteries and a charger circuit also may be embedded inside the natural object enclosure.

Advantageously, the covert smart solar power system disclosed allows the use of solar panels for covert equipment and deployments, and integrated charger circuits ensure batteries are properly charged and not overcharged, thus greatly extending battery lifetime. Additionally, the system may serve as a stand-alone product which can be retrofit onto existing products, such as game cameras for covert deployments.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 1A:
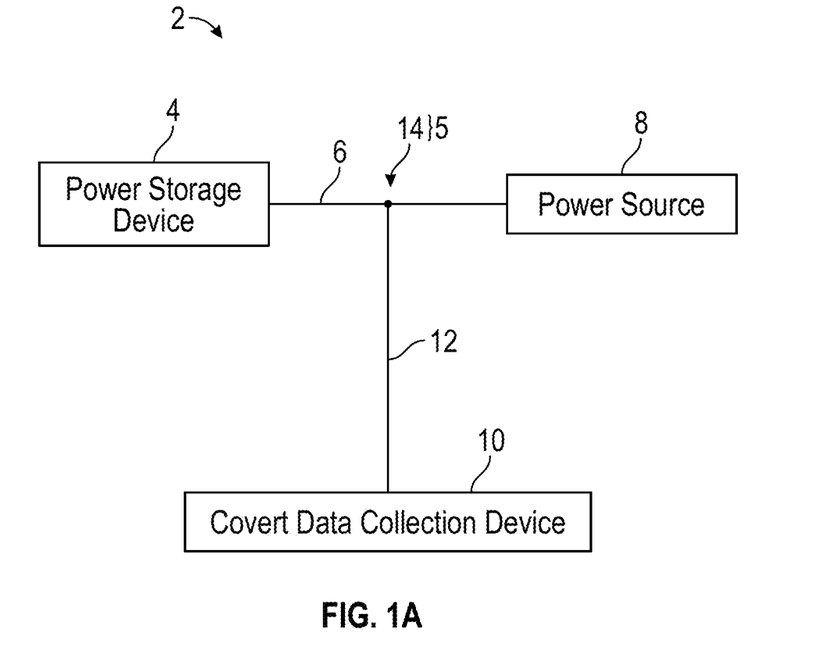
FIGS. 1A and 1B are block diagrams of a covert smart solar power system, according to an exemplary embodiment.
Figure 1B:
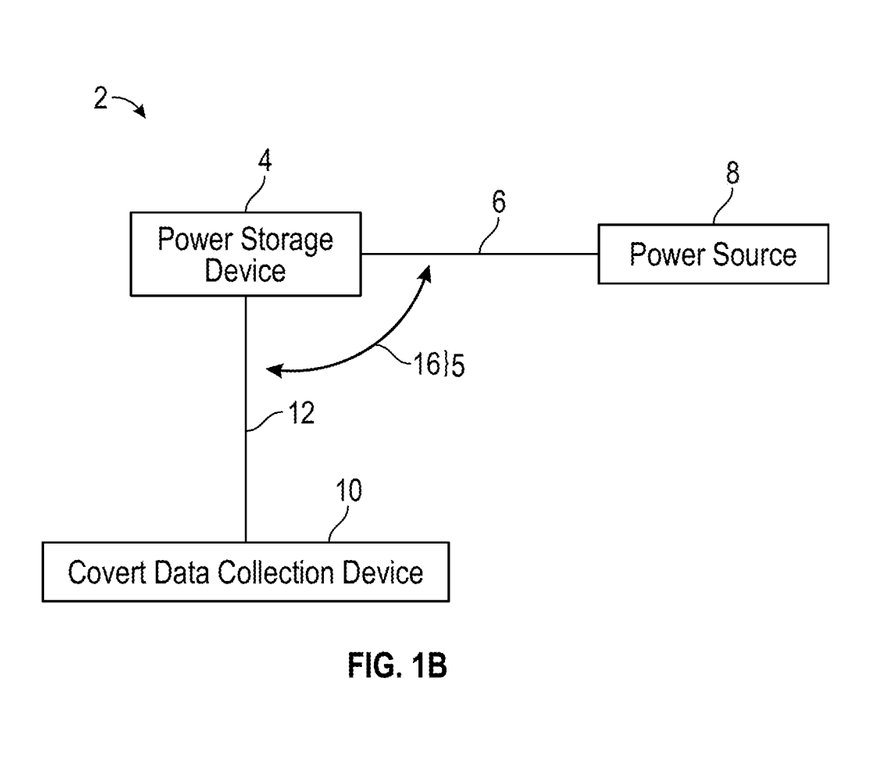

As shown in FIGS. 1A and 1B, a covert smart solar power system 2 is provided. In various embodiments, the covert smart solar power system 2 includes a power storage device 4, a power source 8, a covert data collection device 10, and a power transmission interface 5. In addition, FIG. 1A and FIG. 1B each show a different configuration of the power transmission interface 5, which will be discussed in greater detail later herein.

Figure 2:
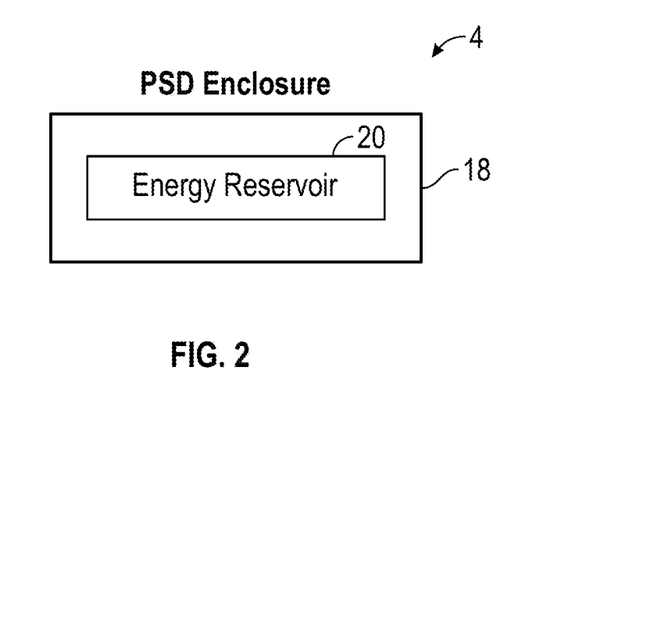
FIG. 2 is a block diagram of a power storage device of the covert smart solar power system, according to an exemplary embodiment.

Referring now to FIGS. 1A, 1B, and 2, the power storage device 4 of the covert smart solar power system 2 is discussed in more specific detail. The power storage device 4 is configured to house and store energy. The power storage device 4 is configured to provide power to the covert data collection device 10. The power storage device 4 further includes a power storage device enclosure 18 and an energy reservoir 20. The power storage device enclosure 18 is a physical container configured to house the energy reservoir 20. The power storage device enclosure 18 may be a battery box. In further instances, the power storage device enclosure 18 may include a battery compartment within the power source 8, for instance, as described herein. The energy reservoir 20 is configured to store and provide energy to the covert data collection device 10. The energy reservoir 20 may comprise a battery. For instance, the energy reservoir 20 may be a lead acid battery, a nickel metal hydride (NiMH) battery, a nickel cadmium (NiCD) battery, a lithium ion (LiON) battery, or any battery as desired. The energy reservoir 20 may be a wet cell battery or may be a dry cell battery. In further instances, the energy reservoir 20 may be a capacitor. In yet further instances, the energy reservoir 20 may be any replenishable electrical charge store capable of being recharged by a solar panel. In still further instances, the energy reservoir 20 is non-replenishable and may be utilized when power provided by a solar panel is inadequate. The non-replenishable energy reservoir 20 may be user replaceable. In further instances, the non-replenishable energy reservoir 20 is single-use.

Figure 3:
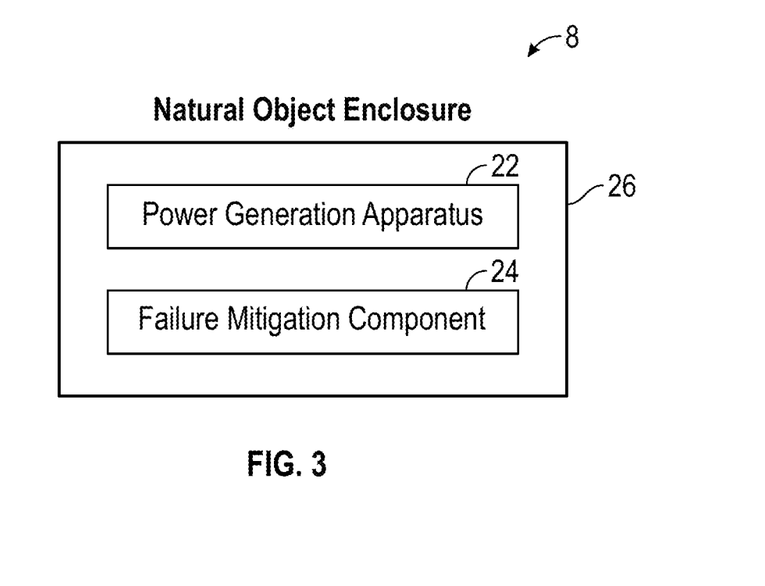
FIG. 3 is a block diagram of a power source of the covert smart solar power system, according to an exemplary embodiment.
Figure 4:
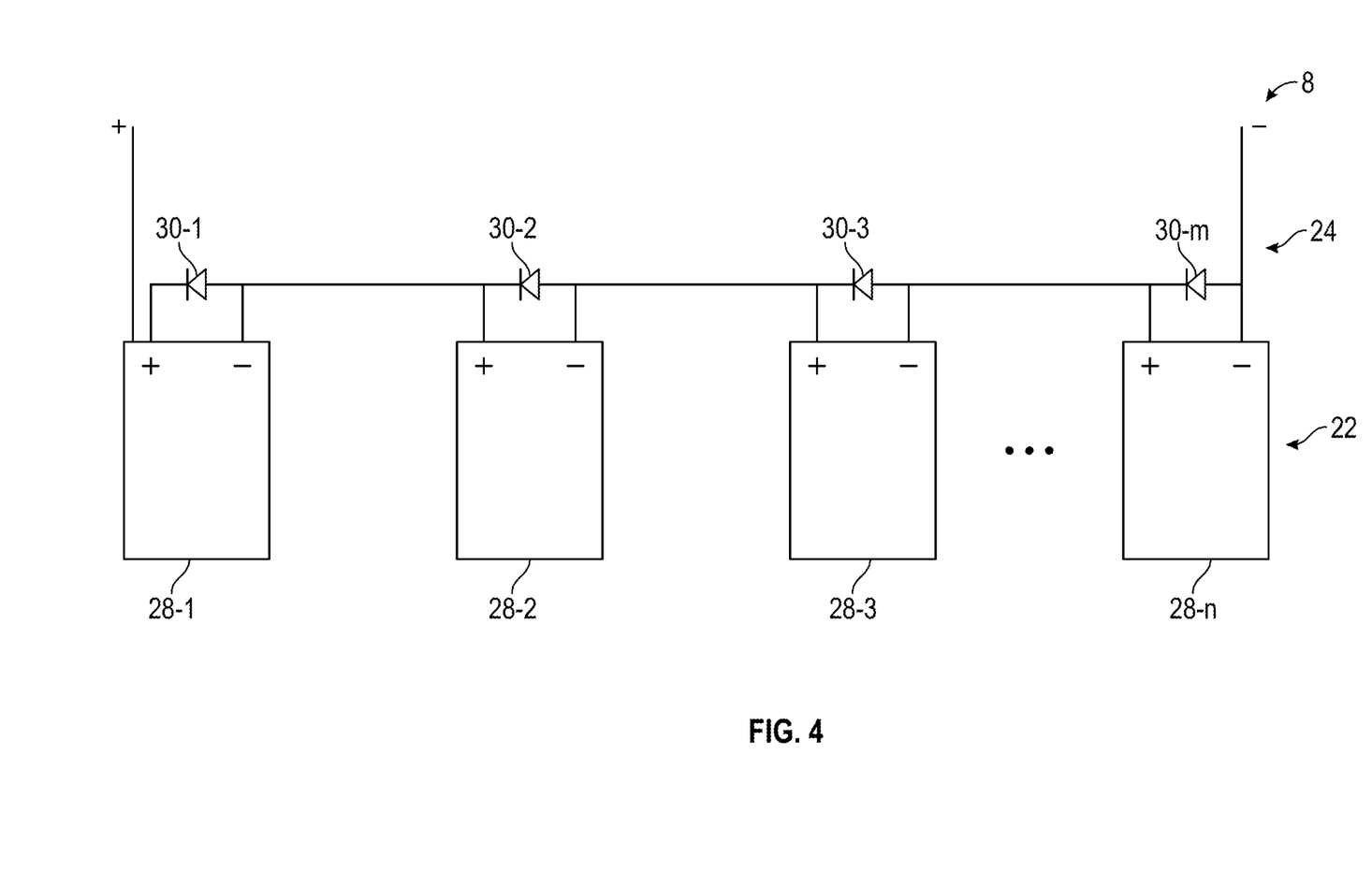
FIG. 4 is a schematic diagram illustrating example electronic components of a power source of the covert smart solar power system, according to an exemplary embodiment.

Referring now to FIGS. 3 and 4, the power source 8 is shown. The power source 8 is configured to provide a covert appearance while allowing for solar charging. The power source 8 may include a power generation apparatus 22. The power generation apparatus 22 is configured to collect solar power energy for the covert smart solar power system 2. For instance, the power generation apparatus 22 may include at least one solar panel. As shown in FIG. 4, the power generation apparatus 22 includes a first solar panel 28-1, a second solar panel 28-2, a third solar panel 28-3, and an nth solar panel 28-n, where n may be as many solar panels as required for the application of the covert smart solar power system 2. A plurality of solar panels 28 may ensure flexibility as the natural object enclosure 26 bends. The solar panels 28-1, 28-2, 28-3, 28-n, may be configured in series or in parallel.

The power source 8 may also include a failure mitigation aspect 24 to improve the performance of the covert smart solar power system 2. As shown in FIG. 4, the failure mitigation aspect may include a first bypass device 30-1, a second bypass device 30-2, a third bypass device 30-3, and an mth bypass device 30-m, where m may be as many bypass devices as required for the application of the covert smart solar power system (e.g., the nth solar panel 28-n corresponds with the mth bypass device 30-m). The bypass devices may be a diode, a switch, etc. Typically, products utilizing small solar panels are placed in a location to reduce the chances of any shadows (e.g., from a tree or pole) crossing over the solar panel because the solar panel may be small enough where the shadow shades the solar panel entirely. However, the covert smart solar power system 2 is frequently desired to be positioned in more discrete locations, thus likely making shadow unavoidable. For instance, when positioned on the ground for long periods of time, branches may fall over the power source 8 and its solar panels and/or trees, grass, and other plants may group around and over the power source 8, significantly reducing the output of the solar panel. Power sources 8 having multiple solar panels 28 connected in series are particularly susceptible to output reduction due to shading. Because the output power of series-wired solar panels is limited by the lowest output cell of the series-wired solar panels, output reductions of over 90% are possible.

Consequently, a failure mitigation aspect 24 may be provided to ameliorate the power-reducing effect of shadows. In various embodiments, a failure mitigation aspect comprises bypass devises 30-1, 30-2, 30-3, 30-n structured and arranged so that when the shadow passes over the solar panels 28-1, 28-2, 28-3, 28-n, the shaded part of the panel(s) is bypassed. There may be one bypass device per solar panel. The solar panels can be divided into sections, or cells, for more bypass devices, or diodes, with one per section. In various embodiments, there may be up to three bypass devices per solar panel, allowing the solar panel to be bypassed in smaller sections. For instance, two bypass devices may be used per solar panel, one for each half, and a third bypass device may be used to reduce losses if the entire panel is shaded (e.g., if the entire panel is shaded, or if both halves are partially shaded, the current will flow through the third bypass panel reducing loss since the current has to flow through only one diode instead of two.) If the solar panel or cell on a solar panel gets shaded, the solar panel is bypassed using the bypass device, and the remaining solar panels continue to provide useable power. In various embodiments, there may be any number of bypass devices per solar panel as desired, further allowing the solar panel to be bypassed in smaller sections. In yet further embodiments, there may be a bypass device for each cell of the solar panel.

The bypass devices 30-1, 30-2, 30-3, 30-n may comprise Schottky diodes. In further instances, a silicon junction diode may be implemented. In various instances, a Schottky diode is desirable due to the typically lower forward voltage (e.g., 150-450 mV) of a Schottky diode relative to the typically higher forward voltage (e.g., 700 mV) of a silicon junction diode. However, it will be understood by a person having ordinary skill in the art that any diode may be used (e.g. silicon diodes). The diodes are placed with their anode on the negative side of the solar panel and their cathode on the positive side of the solar panel so that if the solar panel voltage drops below the diode's forward voltage rating, the current will travel through the diode instead of the solar panel.

Figure 5:
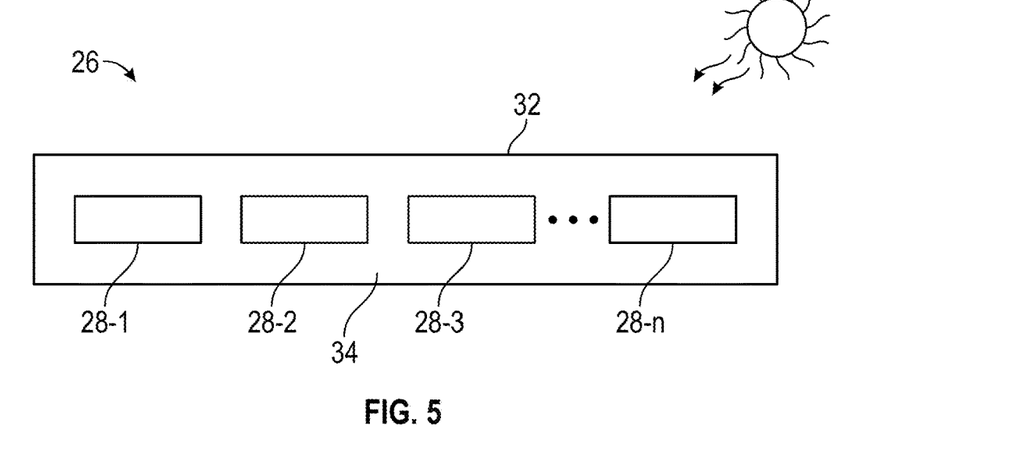
Figure 6A:
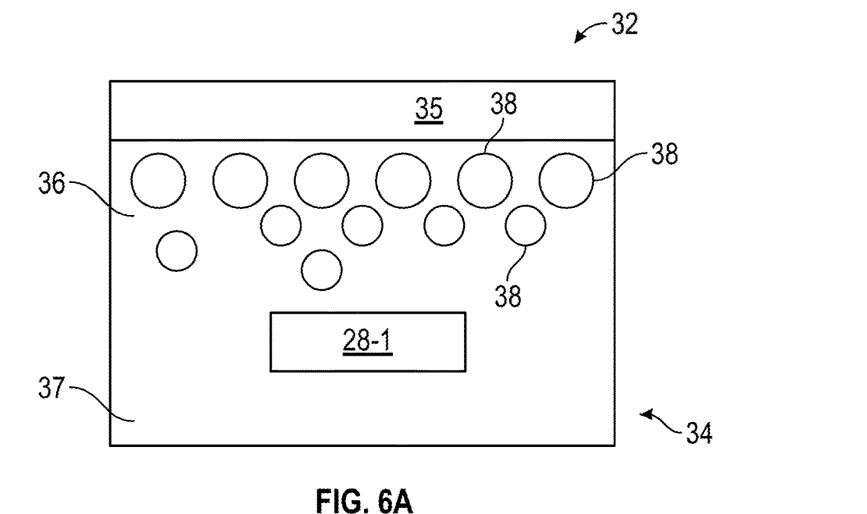
Figure 6B:
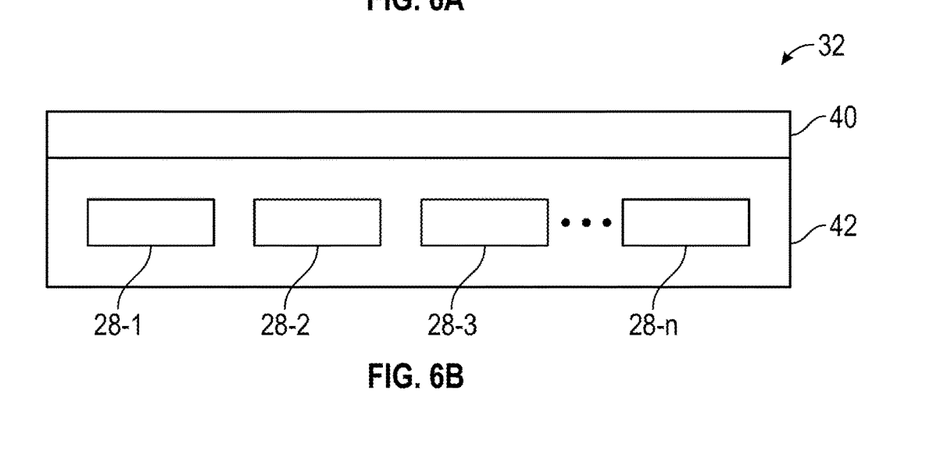
Figure 7:
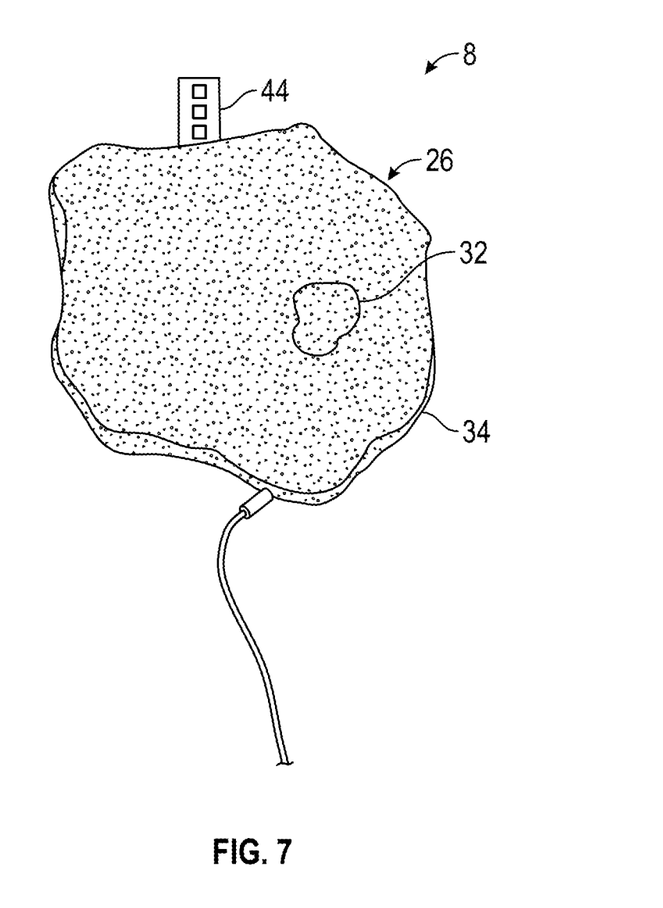
FIG. 7 is a drawing of an example practical implementation of a power source of the covert smart solar power system, according to an exemplary embodiment.

Referring now to FIGS. 5-7, the natural object enclosure 26 is shown. In various embodiments, such as those depicted in FIGS. 5 and 6A, the solar panels 28-1, 28-2, 28-3, 28-n may be fully potted, as will be described herein. In further instances, such as those depicted in FIGS. 5 and 6B, the natural object enclosure may be a lidded box. Finally, and with reference to FIG. 7, a representation of one practical example embodiment of a natural object enclosure 26 resembling a rock is provided. Such an embodiment may be potted. In further instances, such an embodiment may be a lidded box.

Referring to a fully potted embodiment of a natural object enclosure 26, as depicted in FIGS. 5 and 6A, the natural object enclosure 26 includes a light transmissive portion 32. The light transmissive portion 32 may include a camouflaging layer 35 and a first potting material 36. In some embodiments, a filler material 38 may also be provided and combined with the first potting material 36. The first potting material 36 may be a clear urethane compound, or other clear potting compounds such as epoxy, polycarbonate, transparent aluminum armor (ALON), or silicone. The first potting material 36 is a semi rigid to rigid material. The first potting material 36 is UV stabilized. For instance, any combination of clear potting compound with UV protection may be used. This includes using a clear potting compound that is inherently UV resistant like various forms of urethane, a potting compound that can be impregnated with UV stabilizers like epoxy, or a clear compound that can be coated with a UV protectant clear finish. Because of the index of refraction of the potting compound, the potting compound further enhances operation of the solar panel 28 by directing off-axis light onto the solar panels 28 when the sun is rising or setting. The filler material 38 may be glass beads, for instance, added to the first potting material 36 in order to reduce cost. Additionally, a dye may be added to the clear first potting material 36 to enhance a natural appearance. The natural object enclosure 26 may be formed from a mold made from a natural object found in the desired environment (e.g., a rock or a log). The first potting material 36, possibly combined with the filler material 38, may be poured into the portion of the mold that will be the top, sun facing part of the natural object enclosure 26, forming the light transmissive portion 32. The solar panels 28-1, 28-2, 28-3, 28-n may be embedded into this top portion of the natural object enclosure 26. Once cured, a battery charger circuit, if included, may be connected to the solar panels 28-1, 28-2, 28-3, 28-n.

The natural object enclosure 26 further includes a base portion 34 which includes a second potting material 37. The remaining components of the covert smart solar power system 2 may be potted in the base portion 34. In various embodiments, the second potting material 37 is a lower cost electronics compatible potting compound. Filler material 38 may be combined with the second potting material 37. In some embodiments, the second potting material 37 may be an opaque (e.g., black) potting compound. The opaque material may further help disguise the solar panels since the solar panels are black, thus creating a consistent background. Once cured, the natural object enclosure 26 may be removed from the mold, attached to the appropriate connector for the application. A camouflaging layer 35 may be a light coat of specially formulated paint applied to the light transmissive portion 32 to color the natural object enclosure 26 and better blend with the surroundings.

The natural object enclosure 26 may further include a metal tab 44, as shown in FIG. 7. The metal tab 44 may be embedded on an outer surface of the natural object enclosure 26. The metal tab 44 may include various through holes to provide an optional securing mechanism. For instance, the metal tab 44 may be used to secure the covert smart solar power system 2 to sloped terrain with a stake through one of the through holes to prevent the natural object enclosure 26 from sliding.

In various embodiments, as shown in FIGS. 5 and 6B, the natural object enclosure 26 may be a lidded box. As such, the light transmissive portion 32 includes a lid 40. The base portion 34 includes an enclosure 42 wherein the solar panels 28-1, 28-2, 28-3, 28-n may be housed, as opposed to being embedded in the first potting material 36. The lid 40 and the enclosure 42 together may create a waterproof box where the lid 40 looks like a natural object (e.g., a rock or a log). This would allow use of less potting material overall since the natural object enclosure 26, as a box, may be hollow. Additionally, this would allow easy installation of the solar panels 28-1, 28-2, 28-3, 28-n, charging electronics, and possibly batteries, without needing to pot the components inside the first potting material 36 (e.g., urethane).

In various embodiments, the natural object enclosure 26 may include a decorative aspect. For instance, either embodiment as described above may be used with an aesthetic aspects such as a lighting feature. As compared to the security features described herein, the covert smart solar power system 2 may be used with products such as low voltage lighting where it is desired that the solar panel appears as a decorative rock, stepping stones, or bricks in landscaping, for instance, while still providing power to the low voltage lighting system. Other electronics such as LEDs and ambient light sensors could be embedded into the covert data collection device 10 to allow the rocks to glow in the evening using the power that was generated during the sunlight hours.

Figure 8:
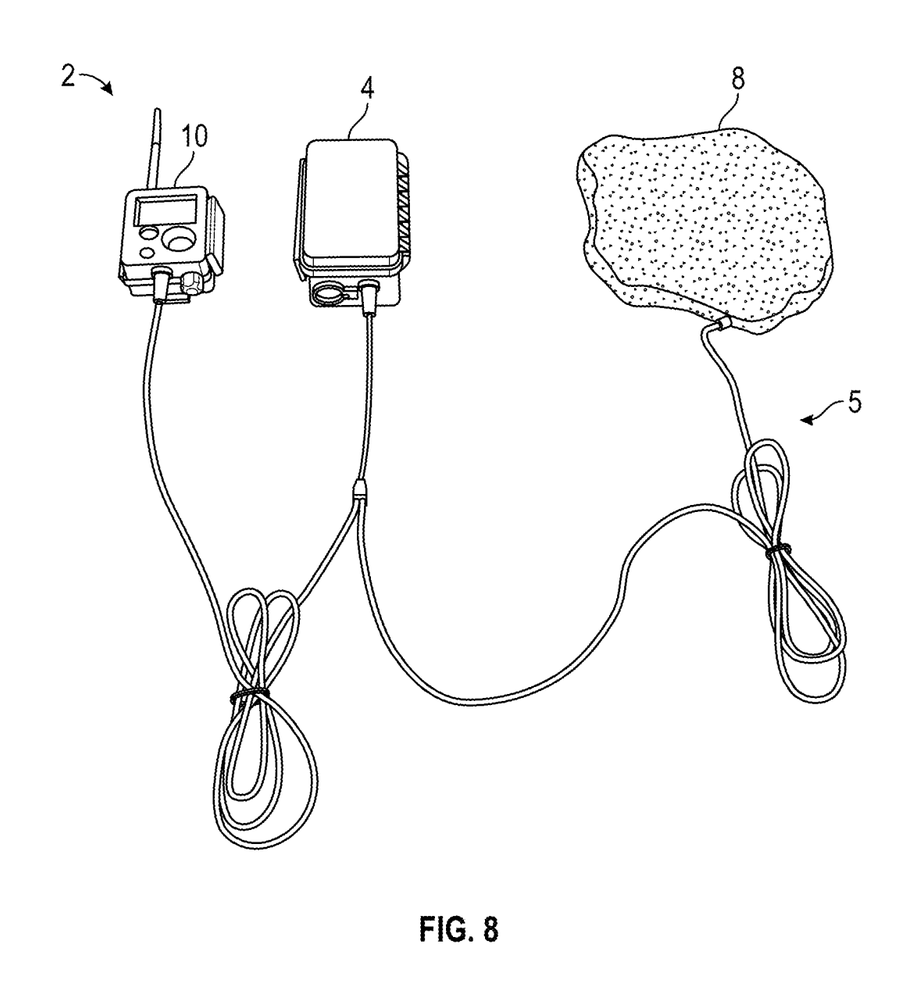
FIG. 8 is an illustration of an example practical implementation of the covert smart solar power system in connection with a camera, according to an exemplary embodiment.

Referring now to FIGS. 1A, 1B, and 8 the covert smart solar power system 2 includes the covert data collection device 10. The covert data collection device 10 is configured to detect desired data in the chosen area, such as detect movement of a person, animal, and/or vehicle. The covert data collection device 10 may be a camera, a radio, an accelerometer, a magnetometer, or a sensor. A power transmission interface 5 is configured to connect the covert data collection device 10 to at least one of the power storage device 4 and the power source 8.

The covert smart solar power system may also include the power transmission interface 5. Various configurations of power transmission interfaces 5 are contemplated. For instance, FIG. 1A shows an example Y-cable configuration 14 of a power transmission interface 5. FIG. 1B shows an example separate cable configuration 16 of a power transmission interface 5. Both such configurations 14, 16 of the power transmission interface 5 may include a first power transmission mechanism 6 and a second power transmission mechanism 12. Each of the first and second power transmission mechanisms 6, 12 may be any apparatus or mechanism for the transmission of electrical power. For example, each of the first and second power transmission mechanisms 6, 12 may include one or more of a cable, an inductive coupling, a radiofrequency coupling, a thermodynamic coupling, etc. In various embodiments, both of the first and second power transmission mechanisms 6, 12 comprise a cable formed with rodent resistant braiding or armor to prevent damage from wildlife.

Turning now to a comparison of the Y-cable configuration 14 and the separate cable configuration 16 of the power transmission interface 5, attention is directed to FIG. 1B which shows a separate cable configuration 16 wherein the first power transmission mechanism 6 may be configured to connect the power storage device 4 and the power source 8, and the second transmission mechanism is configured to connect the power storage device 4 and the covert data collection device 10. Attention is also directed to FIGS. 1A and 8, which show the power transmission interface 5 provided in a Y-cable configuration 14. The Y-cable configuration may allow the power source 8 to plug into a COTS battery box (e.g., the power storage device 4) without having to replace a long cable already used between a covert data collection device 10 (e.g., a camera) and an existing battery box. The Y-cable configuration 14 allows easy installation of the power source 8 without having to re-run and re-camouflage the power storage device 4 or the power transmission interface 5. For applications that require more solar power, the solar panels 28-1, 28-2, 28-3, 28-*n* can be paralleled by connecting them together using the Y-cable configuration 14 so that two or more solar panels can be connected to one energy reservoir 20 (e.g., battery). In an embodiment where the energy reservoir 20 is co-located inside the natural object enclosure 26, described herein, the solar panels would charge the battery to provide additional run time.

Such embodiment where the energy reservoir 20 (FIG. 2) is incorporated inside the natural object enclosure 26 (FIG. 3), may typically be used where the covert data collection device 10 uses a set of internal batteries (e.g., AA alkaline batteries) which cannot be recharged. Thus, while FIG. 2 shows a power storage device 4 with a power storage device enclosure 18 enclosing an energy reservoir 20, one may appreciate that the power storage device enclosure 18 may be an aspect of, or included inside, the natural object enclosure 26 shown in FIG. 3. While the power storage device 4 that has the power storage device enclosure 18 (FIG. 2) and the power source 8 that has the natural object enclosure 26 (FIG. 3) are discussed separately, one may appreciate that they may also share one or more physical structures.

For example, referring to FIGS. 1-7, the covert data collection device 10 (e.g., camera) may have an external 6V power input which is designed to be powered from the 6V SLA battery. The 6V battery box could be used, however it may be more desirable to incorporate a battery back inside the natural object enclosure 26 to eliminate the need to purchase a battery box. As such, a set of 5 NiMH 1.2V rechargeable batteries, for example, may be located inside the natural object enclosure 26. The batteries may be potted inside the natural object enclosure 26 or housed in the embodiment of the natural object enclosure 26 including the lid 40 and the base portion 34. Further, the natural object enclosure 26 may be a sealed enclosure with a lid facing downward and can be opened via a set of screws, thus allowing ease in changing the batteries if they wear out. As such, the solar panels may be potted in the natural object enclosure 26, and wires may be run to a battery box, allowing use with generic solar devices and customized them with the proper battery charger and battery, if needed. Alternatively, a power storage device enclosure 18, which is designed to be potted may be used. For example, NiMH batteries that are rated for low temperature operation may be used, thus allowing better functioning in cold weather. However, it will be understood by one of ordinary skill in the art that any suitable battery (e.g., a sealed lead acid (SLA)) may be used.

In various embodiments, the power source 8 may also include a battery charger circuit configured for the specific application. In further embodiments, the power source 8 may omit the battery charger circuit. In particular, the battery charging voltage and maximum charge current may be set to ensure the energy reservoir 20 is not over charged and damaged. To properly charge the energy reservoir 20, the circuit supports constant current and/or constant voltage charging to ensure the energy reservoir 20 is not over charged. To maximize the output from the solar panels 28-1, 28-2, 28-3, 28-*n* under differing lighting conditions, the circuit may use a Maximum Power Point Tracking (MPPT) algorithm which dynamically adjusts the charging current while monitoring the solar panel voltage and current with a goal of maximizing the power drawing from the solar panels 28-1, 28-2, 28-3, 28-*n*. In some embodiments, a low voltage cutoff circuit may be provided to disconnect the load when the battery gets low to avoid damaging the battery through over discharge.

As another example, the covert smart solar power system 2 may be designed for 12V SLA battery charging. The natural object enclosure 26 mold may be taken from a rock found in the environment that would fit the selected solar panels inside of it. Once the mold is made, several solar panels are placed inside the rock to provide 24 VDC to the battery charger circuit. The battery charger circuit is designed to provide a maximum of 400 mA to the 12V SLA battery and charge it to a maximum voltage of 13.6 VDC. This voltage ensures that the battery is not over charged.

In various embodiments, the covert smart solar power system 2 only includes the covert data collection device 10 and the solar panels 28-1, 28-2, 28-3, 28-*n* within the natural object enclosure 26. In various embodiments, the covert smart solar power system 2 only includes the covert data collection device 10, the solar panels 28-1, 28-2, 28-3, 28-*n* within the natural object enclosure 26, and the battery charger circuit. For instance, as in the case where a COTS battery box is used. As such, the natural object enclosure 26 connects with a COTS 12V battery box to charge a 12V sealed lead acid (SLA) battery. The battery then may be connected to a COTS game camera. In various embodiments, the covert smart solar power system 2 includes the covert data collection device 10, the solar panels 28-1, 28-2, 28-3, 28-n within the natural object enclosure 26, the battery charger circuit, and the energy reservoir 20. In each embodiment, the bypass devices may be included.

Figure 9:
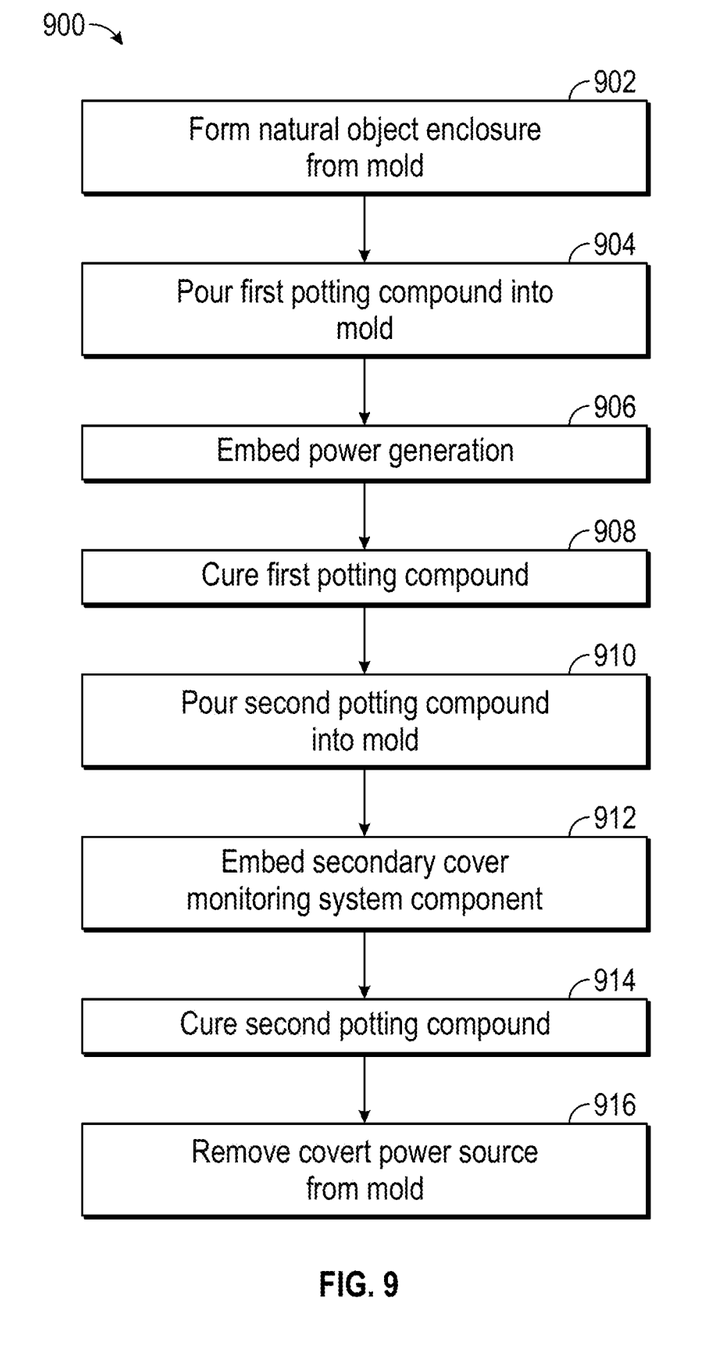
FIG. 9 is a flow chart illustrating a method of manufacturing a covert smart solar power system, according to an exemplary embodiment.

Referring now to FIG. 9, a method 900 of manufacturing a covert power source is illustrated. At 902, a mold is formed for a natural object enclosure. The natural object enclosure includes a light transmissive portion and a base portion. The mold is shaped as a natural object (e.g., a rock or a log). At 904, a first potting compound is poured into the mold to create the light transmissive portion. At 906 a power generation apparatus (e.g., a solar panel) is embedded into the light transmissive portion. At 908, the first potting compound is cured. The power generation apparatus may be connected to a power storage device, a battery charger circuit, and/or a covert data collection device via a power transmission interface (e.g., a cable). At 910 a second potting compound is poured into the mold to create the base portion. In various embodiments, a single pour step may be use to form the entire enclosure, including the light transmissive portion and the base portion together. For example, the pouring of the first potting compound and the pouring of the second potting compound may be a single pouring into the mold. The first potting compound and the second potting compound may be a same potting compound. The first potting compound and the second potting compound may be different potting compounds that are poured sequentially in a single pouring into the mold. At 912, a secondary covert smart solar power system component (e.g., a charger circuit, a battery, a cable, etc.) is embedded into the base portion. At 914, the second potting compound is cured. At 916, the covert power source is removed from the mold. The method 900 may further include applying a camouflaging layer to the light transmissive portion.

Although embodiments of covert smart solar power system have been described in detail, those skilled in the art will also recognize that various substitutions and modifications may be made without departing from the scope and spirit of the appended claims.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but to the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A covert smart solar power system for use with a covert data collection device comprising a camera, the covert smart solar power system comprising:
    a power storage device comprising a power storage device enclosure and an energy reservoir;
    a power source coupled to the power storage device, the power source comprising:
        a natural object enclosure;
        a power generation apparatus comprising a solar panel embedded in the natural object enclosure,
        wherein the natural object enclosure comprises a first potting material comprising a light transmissive portion of the natural object enclosure,
        wherein the light transmissive portion of the natural object enclosure comprises a top part of the natural object enclosure,
        wherein the solar panel is at least partially embedded into the first potting material;
        wherein the natural object enclosure further comprises a base portion comprising a second potting material, wherein the second potting material is an opaque potting material to disguise the solar panel embedded in the first potting material by providing a dark background color opposite the first potting material and solar panel; and
    a power transmission interface configured to couple the covert data collection device comprising the camera to at least one of the power storage device and the power source.

2. The covert smart solar power system of claim 1, wherein the power transmission interface comprises a first power transmission mechanism comprising a first cable.

3. The covert smart solar power system of claim 1, wherein the energy reservoir includes at least one of a battery and a capacitor.

4. The covert smart solar power system of claim 3, wherein the power source includes a charger comprising a maximum power point tracking charger configured to dynamically adjust a charging current provided to the energy reservoir by the charger.

5. The covert smart solar power system of claim 1, wherein the natural object enclosure includes a camouflaging layer comprising paint disposed over the first potting material.

6. The covert smart solar power system of claim 1, wherein the first potting material is at least one of a urethane, polycarbonate, transparent aluminum armor (ALON), and silicone.

7. The covert smart solar power system of claim 1, further comprising a failure mitigation aspect coupled to the power generation aspect, wherein the failure mitigation aspect is at least one bypass device corresponding with the solar panel,
    wherein the bypass device comprises a Schottky diode,
    wherein the Schottky diode is connected in parallel to the solar panel,
    wherein the solar panel is configured to generate a first voltage across a negative side of the solar panel and a positive side of the solar panel, the first voltage exceeding a forward voltage rating of the Schottky diode at a first time, wherein the Schottky diode has an anode and a cathode, wherein the anode is connected to the negative side of the solar panel, wherein the cathode connected to the positive side of the solar panel, and wherein the Schottky diode bypasses a current parallel to the solar panel in response to the first voltage generated by the solar panel not exceeding a forward voltage rating of the Schottky diode at a second time different than the first time.

8. The covert smart solar power system of claim 1, wherein the power transmission interface comprises a first power transmission mechanism and a second power transmission mechanism, wherein the first and second power transmission mechanisms each comprise a cable.

9. The covert smart solar power system of claim 8, wherein the first and second power transmission mechanisms are in a Y-cable configuration, such that the first transmission mechanism couples the power storage device to the power source and the second transmission mechanism couples the first transmission mechanism to the covert data collection device comprising the camera.

10. The covert smart solar power system of claim 8, wherein the first and second power transmission mechanisms are in a separate cable configuration, such that the first power transmission mechanism couples the power storage device to the power source and the second transmission mechanism couples the power storage device to the covert data collection device comprising the camera.

11. The covert smart solar power system of claim 1, wherein the light transmissive portion comprises a refractive material whereby off-axis light is directed onto the solar panel embedded in the first potting material of the natural object enclosure to generate power.

12. The covert smart solar power system of claim 1, wherein the first potting material is epoxy.

13. A covert power source configured to power a device, the covert power source comprising:

a natural object enclosure; and a power generation apparatus comprising a solar panel embedded in the natural object enclosure, wherein the natural object enclosure comprises a first potting material comprising a light transmissive material configured to be a top part of the natural object enclosure and receive the solar panel at least partially embedded in the first potting material;

wherein the natural object enclosure further comprises a base portion comprising a second potting material, wherein the second potting material is an opaque potting material to disguise the solar panel embedded in the first potting material by providing a dark background color opposite the first potting material and solar panel; and a power transmission interface configured to couple the covert power source to the device.

14. The covert power source of claim 13, further comprising a failure mitigation aspect coupled to the solar panel.

15. The covert power source of claim 14, wherein the power generation apparatus further comprises a plurality of solar panels, and wherein the failure mitigation aspect comprises a plurality of bypass devices corresponding with the plurality of solar panels.

16. The covert power source of claim 13, wherein the power generation apparatus further comprises a plurality of solar panels, the plurality of solar panels in a series electrical configuration.

17. The covert power source of claim 13, wherein the power generation apparatus further comprises a plurality of solar panels, the plurality of solar panels in a parallel electrical configuration.

18. The covert power source of claim 13, further comprising a metal tab on an outer surface of the natural object enclosure.

19. The covert power source of claim 13, wherein the device comprises a covert data collection device comprising a camera.

20. The covert power source of claim 13, wherein the light transmissive portion comprises a refractive material whereby off-axis light is directed onto the solar panel embedded in the first potting material of the natural object enclosure.

* * * * *